(12) United States Patent
Nakamura et al.

(10) Patent No.: US 9,769,093 B2
(45) Date of Patent: Sep. 19, 2017

(54) APPARATUS AND METHOD FOR PERFORMING INFINIBAND COMMUNICATION BETWEEN USER PROGRAMS IN DIFFERENT APPARATUSES

(71) Applicant: FUJITSU LIMITED, Kawasaki-shi, Kanagawa (JP)

(72) Inventors: Minoru Nakamura, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 340 days.

(21) Appl. No.: 14/682,385

(22) Filed: Apr. 9, 2015

(65) Prior Publication Data

US 2015/0326661 A1 Nov. 12, 2015

(30) Foreign Application Priority Data

May 8, 2014 (JP) .................................. 2014-096871

(51) Int. Cl.
*G06F 15/16* (2006.01)
*H04L 12/861* (2013.01)
(Continued)

(52) U.S. Cl.
CPC ........ *H04L 49/9031* (2013.01); *H04L 49/358* (2013.01); *H04L 67/1095* (2013.01); *H04L 67/141* (2013.01)

(58) Field of Classification Search
CPC ............... H04L 49/358; H04L 49/9031; H04L 67/1095; H04L 67/141
(Continued)

(56) References Cited

U.S. PATENT DOCUMENTS 7,010,607 B1 * 3/2006 Bunton ..................... H04L 1/24
   709/228
7,024,613 B2 * 4/2006 Carnevale ............. H04L 49/901
   370/412
(Continued)

FOREIGN PATENT DOCUMENTS

JP    2005-524264    8/2005

OTHER PUBLICATIONS

O'Reilly Media, 2002, An Introduction to InfiniBand Architecture, pp. 1-2.*
Wikipedia, InfiniBand, pp. 1-5.*

*Primary Examiner* — Ario Etienne
*Assistant Examiner* — Thorne E Waugh
(74) *Attorney, Agent, or Firm* — Staas & Halsey LLP

(57) ABSTRACT

In InfiniBand, communication is made between a first queue-pair (QP) allocated to a first user-program executed within a first apparatus and a second QP allocated to a second user-program executed within a second apparatus. The first apparatus sets a specific code to a send work-request, after moving information previously set to the send work-request to a portion of the data, and transmits the data added with a first QP number identifying the first QP to the second apparatus. The second apparatus determines that the received data is added with the QP number, when the specific code is set to a receive work-request, identifies the first user-program based on the QP number, and sends the data to the second user-program via the receive work-request after deleting the QP number from the data and moving information stored in the portion of the data to the receive work-request.

5 Claims, 13 Drawing Sheets

(51) Int. Cl.
    *H04L 29/08*      (2006.01)
    *H04L 12/931*     (2013.01)
(58) Field of Classification Search
    USPC .................................................. 709/203–247
    See application file for complete search history.

(56) References Cited

U.S. PATENT DOCUMENTS

| | | | | |
|---|---|---|---|---|
| 7,342,934 B1 * | 3/2008 | Mott | ..................... | H04L 49/901 |
| | | | | 370/392 |
| 7,466,716 B2 * | 12/2008 | Dorsch | .................. | H04L 69/12 |
| | | | | 370/412 |
| 7,620,693 B1 * | 11/2009 | Mott | ..................... | H04L 47/621 |
| | | | | 709/213 |
| 7,899,050 B2 * | 3/2011 | Craddock | ............... | H04L 45/16 |
| | | | | 370/238 |
| 7,936,753 B1 * | 5/2011 | Colloff | ............... | H04L 12/1868 |
| | | | | 370/390 |
| 8,244,825 B2 * | 8/2012 | Subramanian | ...... | H04L 67/1097 |
| | | | | 709/212 |
| 8,458,280 B2 * | 6/2013 | Hausauer | ............ | H04L 47/6265 |
| | | | | 709/212 |
| 8,699,521 B2 * | 4/2014 | Keels | .................. | H04L 49/9094 |
| | | | | 370/464 |
| 8,719,456 B2 * | 5/2014 | Wilkinson | ........... | G06F 13/4059 |
| | | | | 710/11 |
| 8,799,564 B2 * | 8/2014 | Fritz | ......................... | G06F 7/00 |
| | | | | 710/15 |
| 8,804,752 B2 * | 8/2014 | Manula | .................. | H04L 49/358 |
| | | | | 370/412 |
| 8,954,785 B2 * | 2/2015 | Fox | ........................ | G06F 15/167 |
| | | | | 370/225 |
| 9,069,633 B2 * | 6/2015 | Manula | .................... | G06F 9/546 |
| 9,307,053 B2 * | 4/2016 | Pelissier | ................. | H04L 69/08 |
| 2003/0202519 A1 | 10/2003 | Beukema et al. | | |
| 2015/0195152 A1 * | 7/2015 | Shinohara | ........... | H04L 41/5041 |
| | | | | 709/223 |

* cited by examiner

FIG.2

| InfiniBand CONCEPT | Ehternet AND IP CONCEPTS |
|---|---|
| HCA | Network Interface Card(NIC) |
| LID | IP ADDRESS |
| QP | SOCKET |
| QP NUMBER | PORT NUMBER |
| RC | TCP |
| SQ | TRANSMISSION BUFFER OF SOCKET |
| RQ | RECEPTION BUFFER OF SOCKET |
| CQ | CORRESPONDING CONCEPT DOES NOT EXIST |

FIG.8

| NAME | DESCRIPTION |
|---|---|
| sg_list | POINTER TO AN ARRAY OF SCATTER/GATHER LIST |
| num_sge | THE NUMBER OF ARRAYS POINTED BY sg_list |
| IMM | IMMEDIATE DATA TO BE SENT TO RECEIVING SIDE |

FIG.9

| NAME | DESCRIPTION |
|---|---|
| wr_id | 64-BIT VALUE CAPABLE OF BEING SET FOR EACH ReceiveWR |
| sg_list | POINTER TO AN ARRAY OF SCATTER/GATHER LIST |
| num_sge | THE NUMBER OF ARRAYS POINTED BY sg_list |
| IMM | IMMEDIATE DATA SENT FROM SENDING SIDE |

FIG.10

| NAME | DESCRIPTION |
|---|---|
| addr | START ADDRESS OF A SET OF SCATTER/GATHER LIST |
| length | SIZE OF A SET OF SCATTER/GATHER LIST IN BYTES |

FIG.11

| NAME | DESCRIPTION |
|---|---|
| wr_id | A COPY OF wr_id OF ReceiveWR |
| byte_len | SIZE OF RECEIVE DATA |
| IMM | A COPY OF IMM OF SendWR |
| slid | LID OF SENDER |

APPARATUS AND METHOD FOR PERFORMING INFINIBAND COMMUNICATION BETWEEN USER PROGRAMS IN DIFFERENT APPARATUSES

CROSS-REFERENCE TO RELATED APPLICATION

This application is based upon and claims the benefit of priority from the prior Japanese Patent Application No. 2014-096871 filed on May 8, 2014, the entire contents of which are incorporated herein by reference.

FIELD

The embodiments discussed herein are related to apparatus and method for performing InfiniBand communication between user programs in different apparatuses.

BACKGROUND

InfiniBand has been used recently in, for example, a communication between HPC (High Performance Computing)-based servers. In InfiniBand, a HCA (Host Channel Adaptor) is installed in the information processing apparatus and the communication is made between the QP (Queue Pair) within the HCA of a sending side and the QP within the HCA of a receiving side. Numbers of 1 to 49,151 that are unique in a network and called the LID (Local Identifier) are respectively assigned to the ports of the HCA. A single HCA may theoretically include $2^{24}$-1 QPs and the QPs have QP numbers spanning from 0 to $2^{24}$-1 that are unique within the HCA.

There is a communication scheme called the RC (Reliable Connection) provided by InfiniBand and a one-to-one communication is made between a pair of QPs in the RC. A pair of QPs notify and exchange LIDs and QP numbers of their own with each other to establish a connection between the QPs. A message of InfiniBand contains a LID that indicates a sender, and the message sent from a QP which belongs to an information processing apparatus having an LID different from that of the intended communication counterpart is discarded by the HCA of the receiving side.

FIG. 16 is a diagram illustrating a situation where a message sent from a communication counterpart other than the intended communication counterpart in the RC communication is discarded. In FIG. 16, the communication is made between a first QP having the LID of "1" and the QP number of "3000" and a second QP having the LID of "2" and the QP number of "4000". In this case, when a third QP having the LID of "3" and the QP number of "5000" unilaterally transmits a message to the second QP having the LID of "2" and the QP number of "4000", the HCA of the receiving side checks the LID within the message and does not receive the message because the message is transmitted from a communication counterpart other than the intended communication counterpart. Therefore, the second QP does not erroneously receive the message transmitted from a communication counterpart other than the intended communication counterpart.

However, a QP number that identifies the sender is not contained in the message of InfiniBand. Further, the other QP which belongs to the same information processing apparatus as that to which the intended communication counterpart belongs has the same LID as that of the intended communication counterpart. Accordingly, when the message is transmitted from the other QP which belongs to the information processing apparatus to which the intended communication counterpart belongs, the second QP of the receiving side is unable to discern the other QP from the intended communication counterpart and thus receives the message.

FIG. 17 is a diagram illustrating a situation where a message transmitted from a communication counterpart other than the intended communication counterpart in the RC communication is received. In comparison with FIG. 16, a third QP having the QP number of "5000" belongs to the same information processing apparatus in FIG. 17. Accordingly, since the LID of the third QP having the QP number of "5000" is identical to the LID of the first QP having the QP number of "3000", the second QP of the receiving side receives the message transmitted from an QP other than the intended communication counterpart.

That is, in a case where a plurality of programs are included within the same information processing apparatus and respective programs perform the communication over InfiniBand, different QPs are respectively allocated to the programs. In the case, it is assumed that the RC communication of InfiniBand is made between two programs. However, the QP of the receiving side is not able to discern the program of the intended communication counterpart from the other program which is present in the same information processing apparatus as that in which the intended communication counterpart is present. Therefore, it is possible for a malicious program to counterfeit and send a message of InfiniBand.

Further, in a case of design where a QP is reused after disconnection of the RC communication, even though the program does not intend to maliciously send the message, the QP is likely to send the message to the communication counterpart without recognizing that the communication counterpart's QP has already established the connection with other QP than the QP. In this case, the QP of the receiving side is in danger of receiving the message from a communication counterpart which is not the intended communication counterpart at that time. Such a state where the outdated connection to be invalidated remains is called a Stale Connection.

Accordingly, in the RC communication, an QP of the sending side inserts an QP number thereof into a message and sends the message, and an QP of the receiving side checks the QP number. When the QP number does not correspond to the QP number of the intended communication counterpart, the receiving side may recognize that the message is incorrectly sent.

In the meantime, there is a technology in which the connection in the RC communication is managed by a higher-level middleware. However, when it is intended to use the higher-level middleware, the source program of InfiniBand is required to be modified, and the technology may not be applied to the existing program. Further, since all the InfiniBand programs are required to be operated under the management of middleware, operating some of the InfiniBand programs without being managed under the middleware is not permitted.

Further, there is a conventional technology in which an instance number is associated with a logical connection when the logical connection is established between a sending side and a receiving side, the sending side sends data by adding the instance number to the data, and the receiving side checks the instance number to determine whether the data belongs to the logical connection.

Related techniques are disclosed in, for example, Japanese National Publication of International Patent Application No. 2005-524264.

SUMMARY

According to an aspect of the invention, an apparatus performs communication with another apparatus using InfiniBand in which communication is made between a queue pair (QP) allocated to a user program executed within a sending side apparatus and a QP allocated to a user program executed within a receiving side apparatus. When the apparatus serves as the sending side apparatus and a first user program executed within the apparatus transmits first data to the another apparatus, the apparatus sets a specific code in a predetermined area of a send work request via which the first user program controls transmission of the first data, after moving information previously set in the predetermined area of the send work request to a predetermined portion of the first data, and transmits the first data added with a first QP number identifying a first QP allocated to the first user program to the another apparatus. When the apparatus serves as the receiving side apparatus and a second user program executed within the apparatus receives second data from the another apparatus, the apparatus determines that the second data is added with a second QP number identifying a second QP allocated to a third user program executed within the another apparatus when the specific code is set in a predetermined area of a receive work request via which the second user program controls reception of the second data, identifies the third user program executed within the another apparatus based on the second QP number, and sends the second data to the second user program via the receive work request after deleting the second QP number from the second data and moving information stored in a predetermined portion of the second data to the predetermined area of the receive work request.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a comparison between InfiniBand concept and Ethernet (registered trademark) and IP concepts;

FIG. 8 is a diagram illustrating an example of a data structure of a SendWR, according to an embodiment;

FIG. 9 is a diagram illustrating an example of a data structure of a ReceiveWR, according to an embodiment;

FIG. 10 is a diagram illustrating an example of a data structure of an entry of a scatter/gather list, according to an embodiment;

FIG. 11 is a diagram illustrating an example of a data structure of a ReceiveWC, according to an embodiment;

DESCRIPTION OF EMBODIMENTS

Checking all the messages by incorporating the QP number therein as described above causes ineffectiveness. Specifically, it takes time to perform the processing of inserting the QP number into the message or eliminating the QP number from the message. Further, inclusion of the QP number increases the amount of communication.

Hereinafter, descriptions will be made on embodiments of an information processing apparatus, an information processing system, and a relay program disclosed in the present disclosure in detail with reference to accompanying drawings. In the meantime, the preset disclosure is not limited to the embodiments.

[Embodiment]

Figure 1:
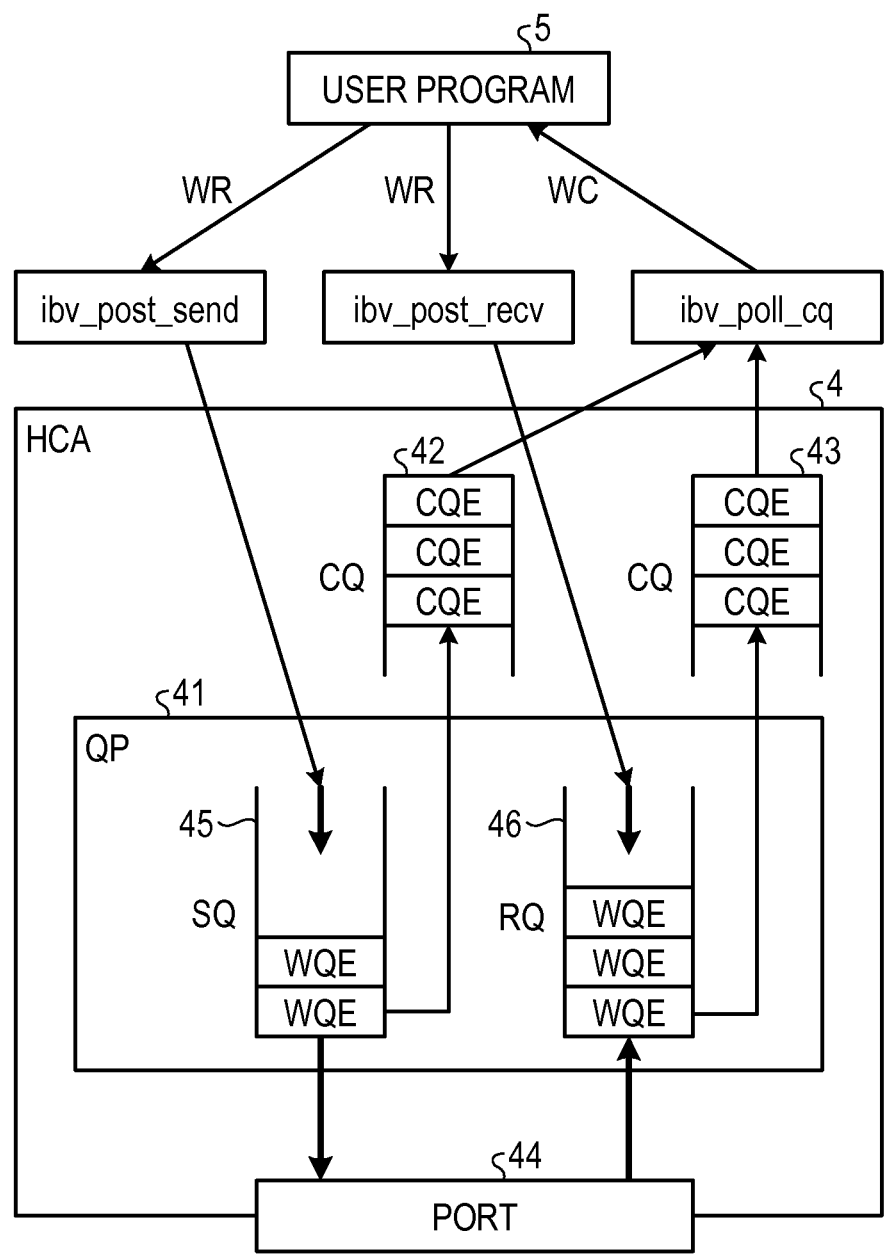
FIG. 1 is a diagram illustrating an example of a model in a case where a program executes a message communication using an RC scheme of InfiniBand, according to an embodiment.

First of all, descriptions will be made on a model in a case where a program performs a message communication using an RC scheme of InfiniBand. FIG. 1 is a diagram illustrating an example of a model in a case where a program executes a message communication using an RC scheme of InfiniBand, according to an embodiment.

In FIG. 1, a user program 5 is a program which performs the communication using the RC scheme of InfiniBand. The "ibv_post_send", "ibv_post_recv", and "ibv_poll_cq" are functions of a user library of InfiniBand that are called in a case where the user program 5 performs the communication using the RC scheme of InfiniBand.

A HCA 4 is an adapter installed in the information processing apparatus which performs the communication using InfiniBand. The HCA 4 includes a QP 41, a CQ 42, a CQ 43, and a port 44. The QP 41 communicates with a QP included in other HCA. The QP 41 includes a SQ (Send Queue) 45 and a RQ (Receive Queue) 46. The SQ 45 is a queue storing information about a message to be sent and the RQ 46 is a queue storing information about a received message.

The CQ 42 is a queue storing information about the message which has been sent and the CQ 43 is a queue storing information about the message of which reception is completed. The port 44 sends and receives the message to and from the port of other HCA.

The user program 5 executes the "ibv_post_send" function on the QP 41 at the time when sending the message. Data given to the "ibv_post_send" function is called a SendWR (Send Work Request) and includes information on or a buffer address of a send-destination.

The SendWR is converted into a WQE (Work Queue Element) by the "ibv_post_send" function and accumulated in the SQ 45. A pointer to the data to be sent is contained in the WQE. When the WQE is successfully accumulated in the SQ 45, the "ibv_post_send" function is immediately returned.

When the WQE is accumulated in the SQ 45, the HCA 4 sends the message according to the content of the WQE. When the message is successfully sent, the HCA 4 deletes the WQE from the SQ and accumulates a CQE (Completion Queue Entry) in the CQ 42.

When the "ibv_poll_cq" function is executed on the CQ 42, the user program 5 may extract the CQEs sequentially. The CQE is converted into a SendWC (Work Completion) at the time of the extraction. The user program 5 may confirm content of the SendWC to confirm whether the message has been sent.

The user program 5 executes the "ibv_post_recv" function on the QP 41 before the message arrives when intending to receive the message. Data given to the "ibv_post_recv" function is called a ReceiveWR (Receive Work Request) and includes, for example, a buffer address. The ReceiveWR is converted into the WQE by the "ibv_post_recv" function and accumulated in the RQ 46. When the WQE is successfully accumulated in the RQ 46, the "ibv_post_recv" function is immediately returned.

When the message is arrived at the QP 41, the HCA 4 extracts a single WQE of the RQ 46 and stores data of the message in the memory according to the content of the WQE. Thereafter, the HCA 4 accumulates a single CQE indicating that the reception of message has been completed in the CQ 43.

When the "ibv_poll_cq" function is executed on the CQ 43, the user program 5 may extract the CQEs sequentially. The CQE is converted into a ReceiveWC at the time of extracting the CQE. The user program 5 may confirm the content of the ReceiveWC to confirm whether the reception of message is completed.

FIG. 2 is a diagram illustrating a comparison between InfiniBand concept and Ethernet (registered trademark) and IP concepts. As illustrated in FIG. 2, the HCA corresponds to a NIC (network interface card), the LID corresponds to an IP address, the QP corresponds to a socket, the QP number corresponds to a port number, the RC corresponds to a TCP, the SQ corresponds to a transmission buffer of the socket, and the RQ corresponds to a reception buffer of the socket. Here, the concepts of the Ethernet and IP that correspond to the CQ of InfiniBand do not exist.

Figure 3:
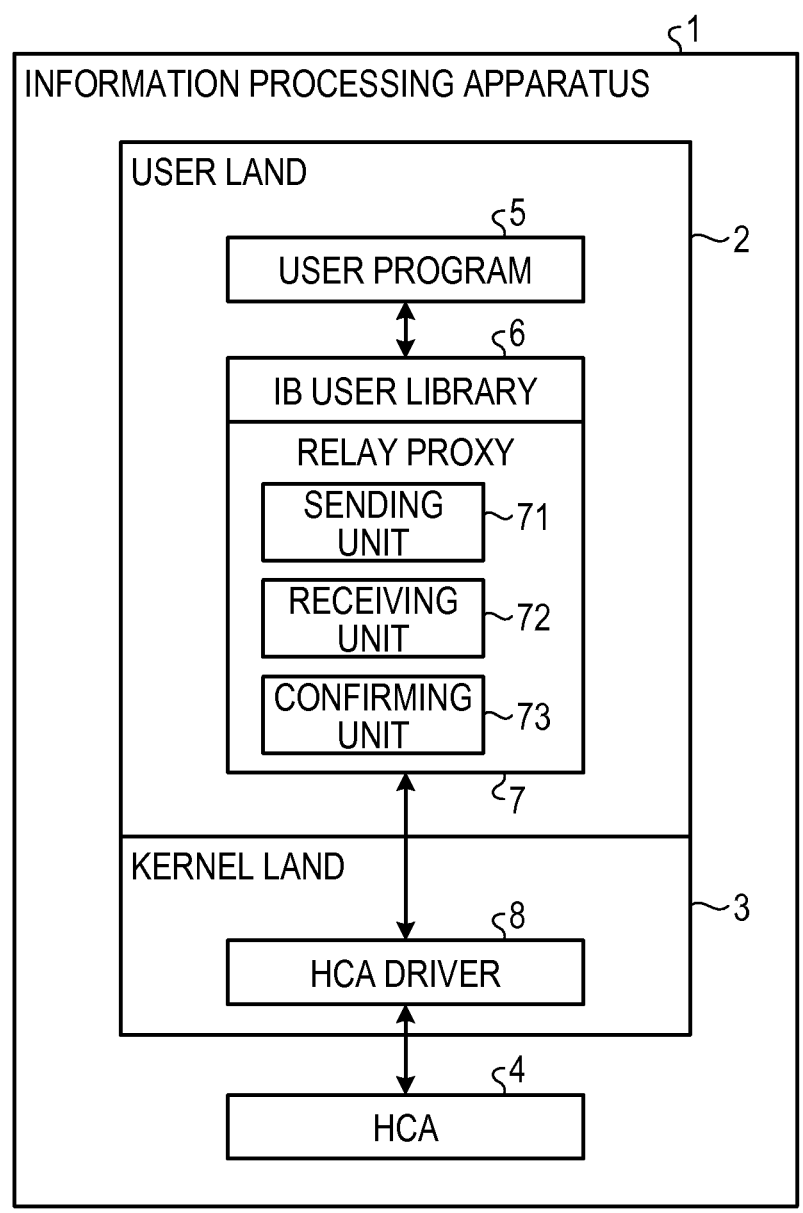
FIG. 3 is a diagram illustrating an example of a functional configuration of an information processing apparatus, according to an embodiment.

Next, descriptions will be made on a functional configuration of the information processing apparatus according to an embodiment. FIG. 3 is a diagram illustrating an example of a functional configuration of an information processing apparatus, according to an embodiment.

As illustrated in FIG. 3, the information processing apparatus 1 includes a user land 2, a kernel land 3, and the HCA 4. The user land 2 is a portion of a program which is executed in a user-mode of the CPU, and the program of the user land 2 has a limitation to CPU instructions allowed to execute and a memory space allowed to access. The kernel land 3 is a portion of a program which is executed in a privileged-mode of the CPU, and does not have a limitation to the CPU instructions allowed to execute and the memory space allowed to access.

A HCA driver 8 is included in the kernel land 3. The HCA driver 8 is a driver which sends and receives the message using the HCA 4.

The user program 5, an IB (InfiniBand) user library 6, and a relay proxy 7 are included in the user land 2. The IB user library 6 is a library of programs called by the user program 5 when the user program 5 performs the communication using InfiniBand, and includes "ibv_post_send", "ibv_post_recv", and "ibv_poll_cq" functions.

The relay proxy 7 is a program which intercepts a call for the function included in the IB user library 6 to perform an additional processing. The relay proxy 7 includes a sending unit 71, a receiving unit 72, and a confirming unit 73.

The sending unit 71 adds a QP number to the message at regular intervals. Here, the regular intervals corresponds to, for example, a predetermined number of messages. Specifically, when the user program 5 intends to register the SendWR using the "ibv_post_send" functions, the sending unit 71 intercepts the SendWR and determines whether the QP number is to be added to the message or not based on the sending intervals for message.

When it is determined that the QP number is to be added to the message, the sending unit 71 adds a four-byte source QPN to a body of the message of the user program 5 to send the data as an encapsulated message. Here, the source QPN is the QP number and the encapsulation is to add the source QPN to the message.

Figure 4:
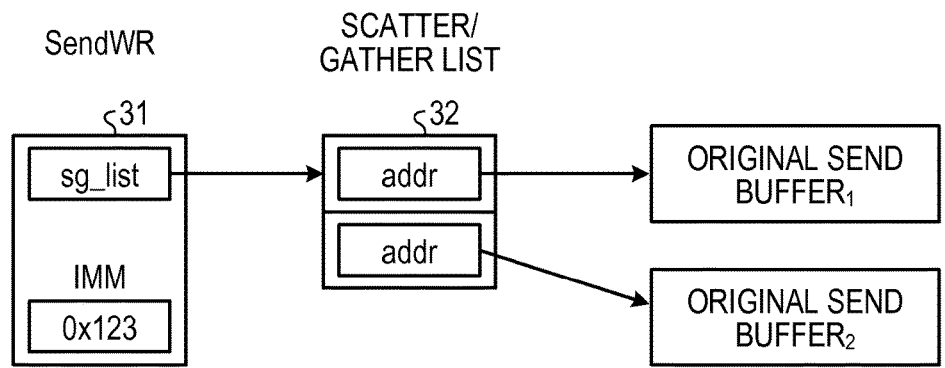
FIG. 4 is a diagram illustrating an example of send data, according to an embodiment.
Figure 5:
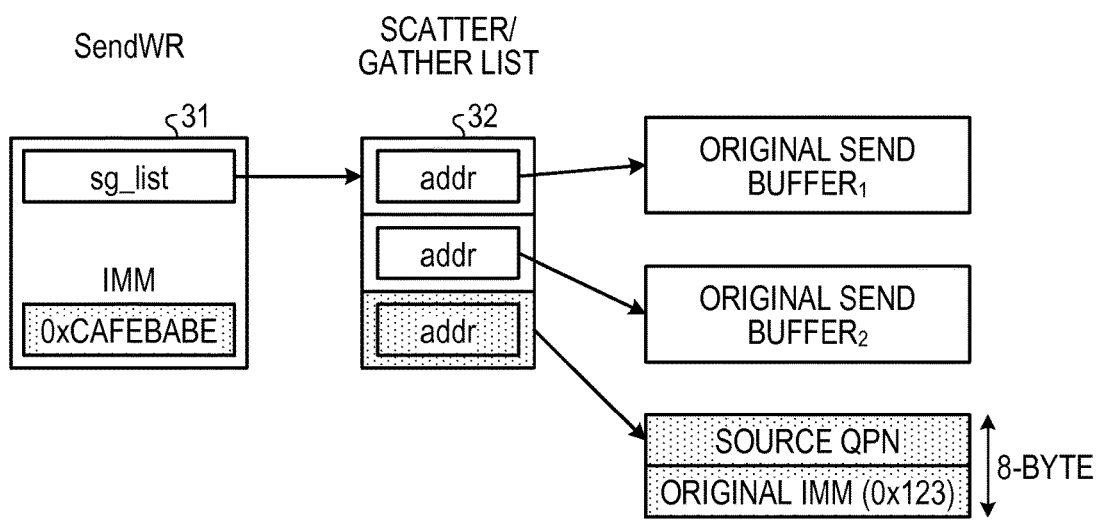
FIG. 5 is a diagram illustrating an example of encapsulated send data, according to an embodiment.

FIG. 4 is a diagram illustrating an example of send data, according to an embodiment, and FIG. 5 is a diagram illustrating an example of encapsulated send data, according to an embodiment. As illustrated in FIG. 4, a "sg_list" and an IMM are included in the SendWR 31. The "sg_list" is a pointer to a scatter/gather list (scatter/gather list) 32 and the scatter/gather list 32 is a list of addresses (addrs) of the pointers to the send buffer that distributively store the send data. The scatter/gather is a component which gathers the data divided into and stored in a plurality of buffers to send and receive. In the meantime, in FIG. 4, although only two addrs are illustrated, the scatter/gather list 32 may include three or more addrs.

The IMM is a four-byte data attached to each message separately from the data transfer through the memory. The IMM is transferred along with the message, but is written in a reception-completed notification (ReceiveWC) separately from a receive buffer. That is, in the data transfer using the IMM, the four-byte data may be notified without the receive buffer.

The sending unit 71 uses the IMM for identifying whether the message is encapsulated or not. Here, the user program 5 uses the IMM and needs to protect a value set in the IMM by the user. Therefore, the sending unit 71 uses a specific value which is less frequently used to be set in the IMM as an identifier which identifies the encapsulation. In this case, the sending unit 71 uses a value of "0xCAFEBABE" as the specific value, where the prefix "0x" indicates that the digits "CAFEBABE" are written in hexadecimal.

As illustrated in FIG. 5, when the encapsulation in which the source QPN is added to the message is intended, the sending unit 71 inserts the digits "CAFEBABE" into the IMM field. Also, the sending unit 71 prepares a send buffer in which the source QPN and the original IMM value are stored and adds the pointer to the prepared send buffer in the scatter/gather list 32.

In the meantime, when it is determined that the QP number is not to be added to the message, the sending unit 71 instructs the HCA driver 8 to send the original send data as it is. However, when the IMM value of the original message is the "CAFEBABE", the sending unit 71 encapsulates and sends the message. In this case, the encapsulation is an extra processing and corresponds to overhead, but the overhead may be reduced using the value having a smaller appearance frequency as the identifier.

When the user program 5 intends to register the ReceiveWR using the "ibv_post_recv" function, the receiving unit 72 intercepts the call for the "ibv_post_recv" function. Also, the receiving unit 72 additionally prepares an extra receive buffer for receiving the source QPN and the original IMM value and registers the ReceiveWR in a state capable of receiving the encapsulated message.

Figure 6:
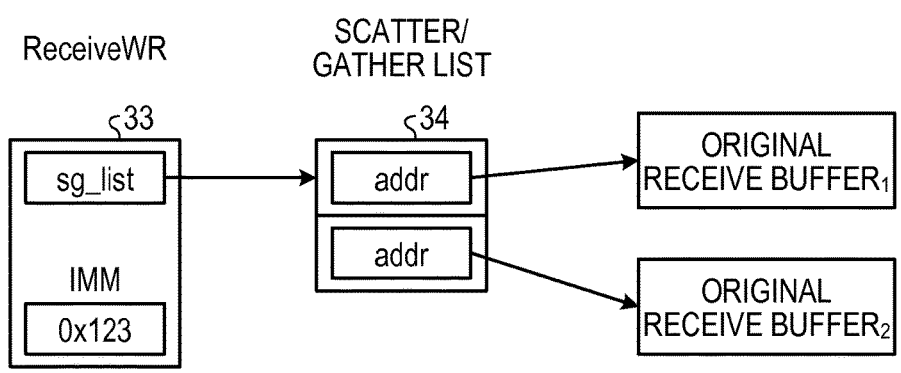
FIG. 6 is a diagram illustrating an example of non-capsulated receive data, according to an embodiment.
Figure 7:
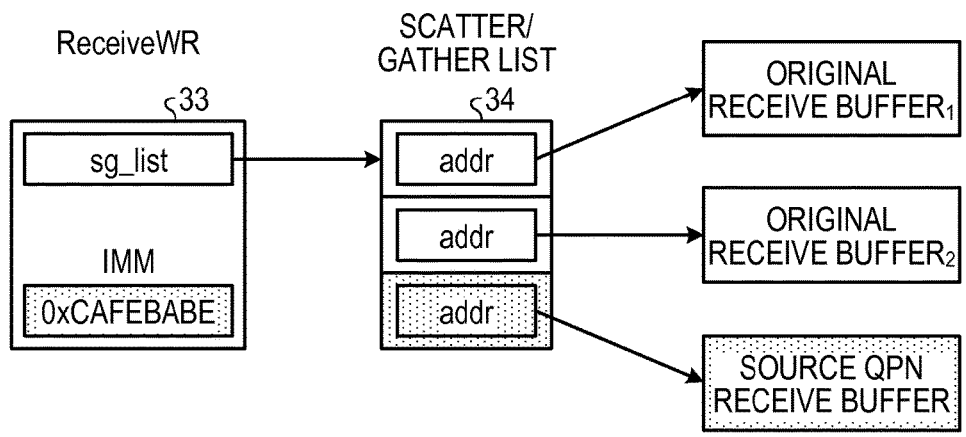
FIG. 7 is a diagram illustrating an example of encapsulated receive data, according to an embodiment.

FIG. 6 is a diagram illustrating an example of non-capsulated receive data, according to an embodiment, and FIG. 7 is a diagram illustrating an example of encapsulated receive data, according to an embodiment. As illustrated in FIG. 6, for a case of the non-capsulated receive data, a value designated by the user program 5 is set in the IMM of the ReceiveWR 33. In the meantime, as illustrated in FIG. 7, for a case of the encapsulated receive data, the value of "0xCAFEBABE" is set in the IMM of the ReceiveWR 33 and a value designated by the user is stored in the additionally prepared receive buffer together with the source QPN.

When the user program 5 intends to confirm the state of reception using the "ibv_poll_cq" function, the confirming unit 73 determines the IMM value of the ReceiveWC, and when it is determined that the IMM value is not the "0xCAFEBABE", the confirming unit 73 returns the ReceiveWC to user program 5.

In the meantime, when it is determined that the IMM value is the "0xCAFEBABE", the confirming unit 73 extracts the QP number from the message and determines whether the extracted QP number is the QP number of the intended communication counterpart. Also, when it is determined that the extracted QP number is the QP number of the intended communication counterpart, the confirming unit 73 decapsulates the encapsulation of message and returns the ReceiveWC to the user program 5. Here, the decapsulation of the encapsulated message indicates that the value of the IMM extracted from the buffer is written back into the IMM within the message and decreases the value of BYTE_LEN by "8" to cut out the last 8 bytes of the message. In the meantime, when it is determined that the extracted QP number is not the QP number of the intended communication counterpart, the confirming unit 73 does not return the ReceiveWC to the user program 5.

Further, when the user program 5 intends to confirm the sending state using the "ibv_poll_cq" function, the confirming unit 73 returns the SendWC to the user program 5.

Next, descriptions will be made on the SendWR 31, the ReceiveWR 33, the scatter/gather list 34, and a data structure of the ReceiveWC with reference to FIG. 5 to FIG. 11. FIG. 8 is a diagram illustrating an example of a data structure of a SendWR, according to an embodiment. As illustrated in FIG. 8, the "sg_list", the "num_sge", and the IMM are included in the SendWR 31. The "sg_list" is a pointer to an array of the scatter/gather list 34 and the "num_sge" indicates the number of arrays pointed by the "sg_list. The IMM is an immediate data to be sent to the receiving side.

FIG. 9 is a diagram illustrating an example of a data structure of a ReceiveWR, according to an embodiment. As illustrated in FIG. 9, the ReceiveWR 33 includes a "wr_id", the "sg_list", the "num_sge", and the IMM, where the "wr_id" is a 64-bit value capable of being set for each ReceiveWR 33 and the "sg_list" is the pointer to an array of the scatter/gather list 34. The "num_sge" indicates the number of arrays pointed by the "sg_list, and the IMM is an immediate data value sent from the sending side.

FIG. 10 is a diagram illustrating an example of a data structure of an entry of a scatter/gather list, according to an embodiment. As illustrated in FIG. 10, an addr and a length are included in an entry of the scatter/gather list 34. The addr indicates a start address of a set of the scatter/gather list 34, that is, a pointer to the buffer in which the data is stored, and the length indicates a size of a set of the scatter/gather list 34 in bytes, that is, a size of the data stored in the buffer.

FIG. 11 is a diagram illustrating an example of a data structure of a ReceiveWC, according to an embodiment. As illustrated in FIG. 11, the "wr_id", a "byte_len", the IMM, and a "slid" are included in the ReceiveWC. The "wr_id" is a copy of the "wr_id" of the ReceiveWR 33 and the "byte_len" indicates a size of the receive data. The IMM is a copy of the IMM of the SendWR 31 and the "slid" indicates an LID of the sender.

Figure 12:
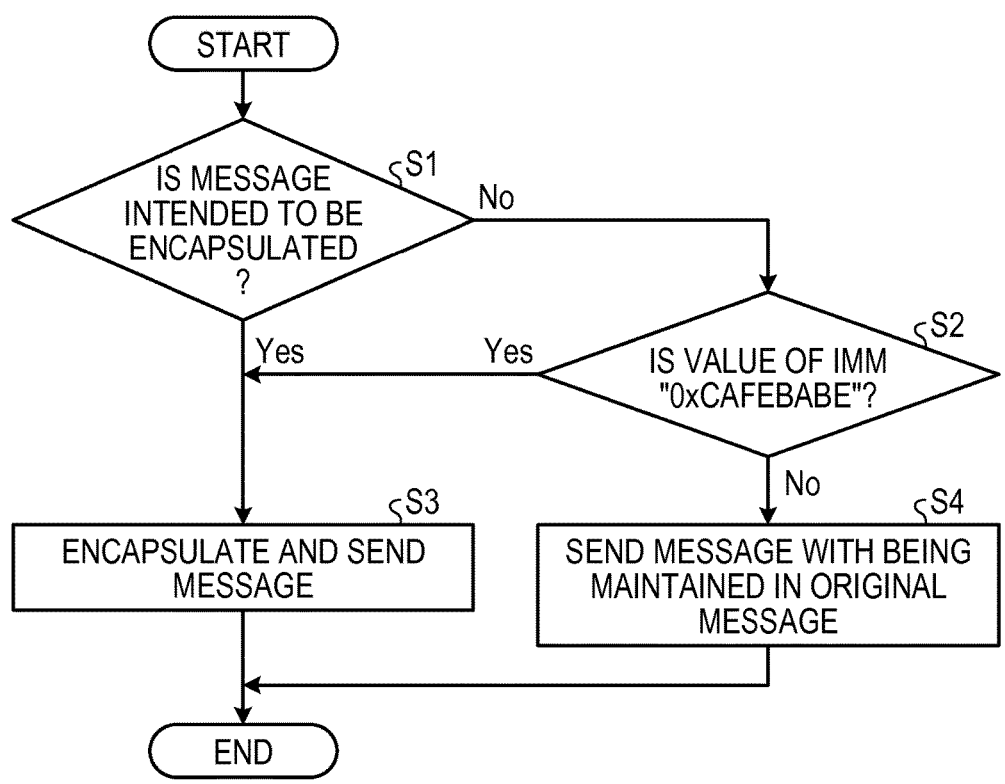
FIG. 12 is a diagram illustrating an example an operational flowchart for a sending process, according to an embodiment.

Next, descriptions will be made on an operational flowchart of the sending process. FIG. 12 is a diagram illustrating an example an operational flowchart for a sending process, according to an embodiment. As illustrated in FIG. 12, the sending unit 71 determines whether the message is intended to be encapsulated (Step S1), and when it is determined that the message is intended to be encapsulated, the sending unit 71 encapsulates and sends the message (Step S3).

In the meantime, when it is determined that the message is not intended to be encapsulated, the sending unit 71 determines whether the IMM value is the "0xCAFEBABE" (Step S2). When it is determined that the IMM value is the "0xCAFEBABE", the sending unit 71 encapsulates and sends the message (Step S3). In the meantime, when it is determined that the IMM value is not the "0xCAFEBABE", the sending unit 71 sends the message with being maintained in the original message of InfiniBand (Step S4).

As described above, the sending unit 71 may encapsulate and send a portion of the messages so as to efficiently transmit the messages.

Figure 13:
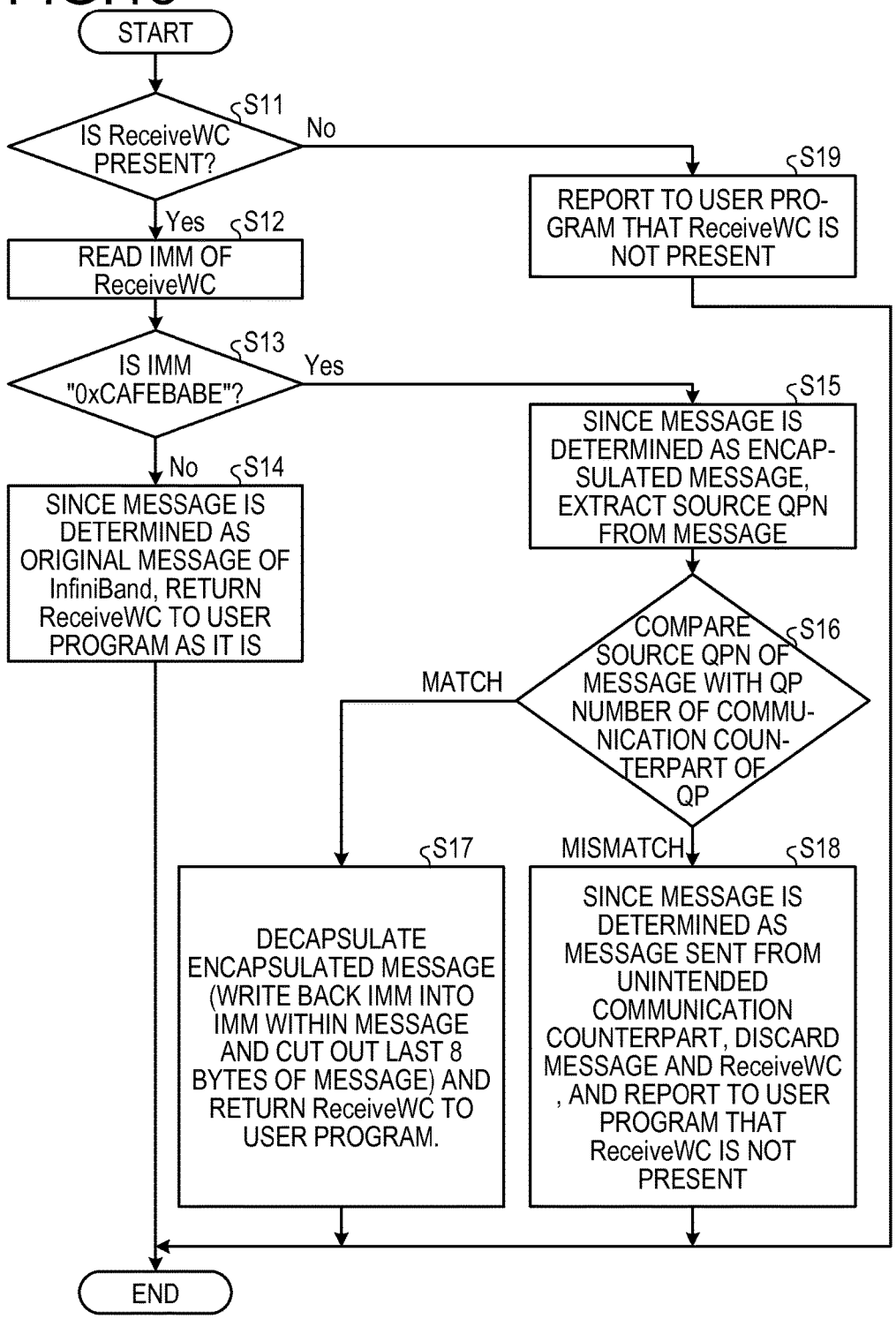
FIG. 13 is a diagram illustrating an example of an operational flowchart for a reception-confirming process, according to an embodiment.

Next, descriptions will be made on an operational flowchart of the reception-confirming process. FIG. 13 is a diagram illustrating an example of an operational flowchart for a reception-confirming process, according to an embodiment. The confirming unit 73 intercepts the reception-confirming process at the timing when the user program 5 calls the "ibv_poll_cq" function, and executes the reception-confirming process instead thereof.

As illustrated in FIG. 13, the confirming unit 73 determines whether the ReceiveWC is present (Step S11), and when it is determined that the ReceiveWC is not present, the confirming unit 73 reports to the user program 5 that the ReceiveWC is not present (Step S19).

In the meantime, when it is determined that the ReceiveWC is present, the confirming unit 73 reads the IMM of the ReceiveWC (Step S12) and determines whether the IMM value is the "0xCAFEBABE" (Step S13). As a result, when it is determined that the IMM value is not the "0xCAFEBABE", the message is determined as the original message of InfiniBand and thus, the confirming unit 73 returns the ReceiveWC to the user program 5 as it is (Step S14)

In the meantime, when it is determined that the IMM value is the "0xCAFEBABE", the message is determined as the encapsulated message and thus, the confirming unit 73 extracts the source QPN from the message (Step S15). Specifically, the confirming unit 73 specifies the ReceiveWR 33 which has received the receive data from the wr_id of the ReceiveWC. Since the source QPN and the original IMM are added in the last eight bytes of the data stored in the buffer of the ReceiveWR 33, the confirming unit 73 extracts the source QPN and the original IMM from the message. Then, the confirming unit 73 compares the source QPN of the message with the QP number of the communication counterpart of the QP (Step S16).

When it is determined that the source QPN of the message is identical with the QP number of the communication counterpart of the QP, the confirming unit 73 decapsulates the encapsulated message and returns the ReceiveWC to the user program 5 (Step S17).

In the meantime, when it is determined that the source QPN of the message is not identical with the QP number of the communication counterpart of the QP, the message is determined as a message sent from an unintended communication counterpart and thus, the confirming unit 73 discards the message and the ReceiveWC in its inside. Also, the confirming unit 73 reports to the user program 5 that the ReceiveWC is not present (Step S18).

As described above, since the confirming unit 73 discards the message and the ReceiveWC in its inside when the source QPN of the message is not identical with the QP number the communication counterpart of the QP, it is possible to prevent the message sent from an illicit sender from being received.

As described above, in the embodiment, the sending unit 71 adds the QP number in the message and sends the message at regular intervals and makes it possible to identify whether the QP number is added in the message using the IMM. Also, the confirming unit 73 determines whether the QP number is added in the received message using the IMM, and checks the QP number only when the QP number is added in the received message. Accordingly, the relay proxy 7 is capable of efficiently checking the QP numbers.

Further, in the embodiment, since the confirming unit 73 discards the message when the QP number added in the message is different from the QP number of the intended communication counterpart, it is possible to prevent data erroneously sent from the user program 5 from being incorrectly received.

Further, in the embodiment, since the sending unit 71 is able to identify whether the message is encapsulated or not using the IMM, the confirming unit 73 is able to efficiently determine whether the message is encapsulated or not.

In the meantime, although the functional configuration of the information processing apparatus 1 is described with reference to in FIG. 3, the relay proxy 7 is executed by the CPU included in the information processing apparatus 1. Accordingly, descriptions will be made on a hardware configuration of the information processing apparatus 1 which executes the relay proxy 7.

Figure 14:
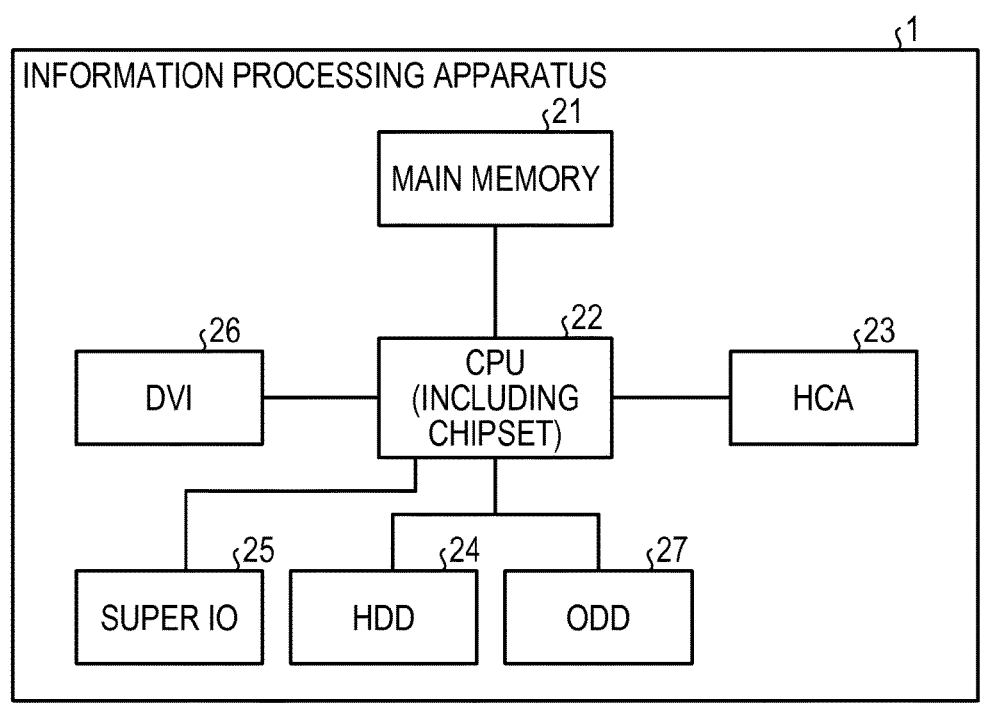
FIG. 14 is a diagram illustrating an example of a hardware configuration of an information processing apparatus, according to an embodiment.

FIG. 14 is a diagram illustrating an example of a hardware configuration of an information processing apparatus, according to an embodiment. As illustrated in FIG. 14, the information processing apparatus 1 includes a main memory 21, a CPU 22, a HCA 23, and a HDD (Hard Disk Drive) 24. Further, the information processing apparatus 1 includes a Super IO (Input Output) 25, a DVI (Digital Visual Interface) 26, and an ODD (Optical Disk Drive) 27.

The main memory 21 is a memory which stores, for example, a program or intermediate results of the running program. The CPU 22 is a central processing unit which reads the program from the main memory 21 and executes the program. The CPU 22 includes a chipset equipped with the memory controller.

The HCA 23 performs the communication in compliance with InfiniBand. The HDD 24 is a disk device storing a program or data, and the Super IO 25 is an interface for connecting an input device, such as a mouse or a keyboard. The DVI 26 is an interface for connecting a liquid crystal display, and the ODD 27 is a device which performs write and read to and from the DVD.

Also, the relay proxy 7 to be executed in the information processing apparatus 1 is stored in the DVD, read out from the DVD by the ODD 27, and installed in the information processing apparatus 1. Otherwise, the relay proxy 7 is stored in, for example, a database of other information processing apparatus connected through the HCA 23 and read out from the database to be installed in the information processing apparatus 1. Also, the installed relay proxy 7 is stored in the HDD 24 and read into the main memory 21 to be executed by the CPU 22.

Figure 15:
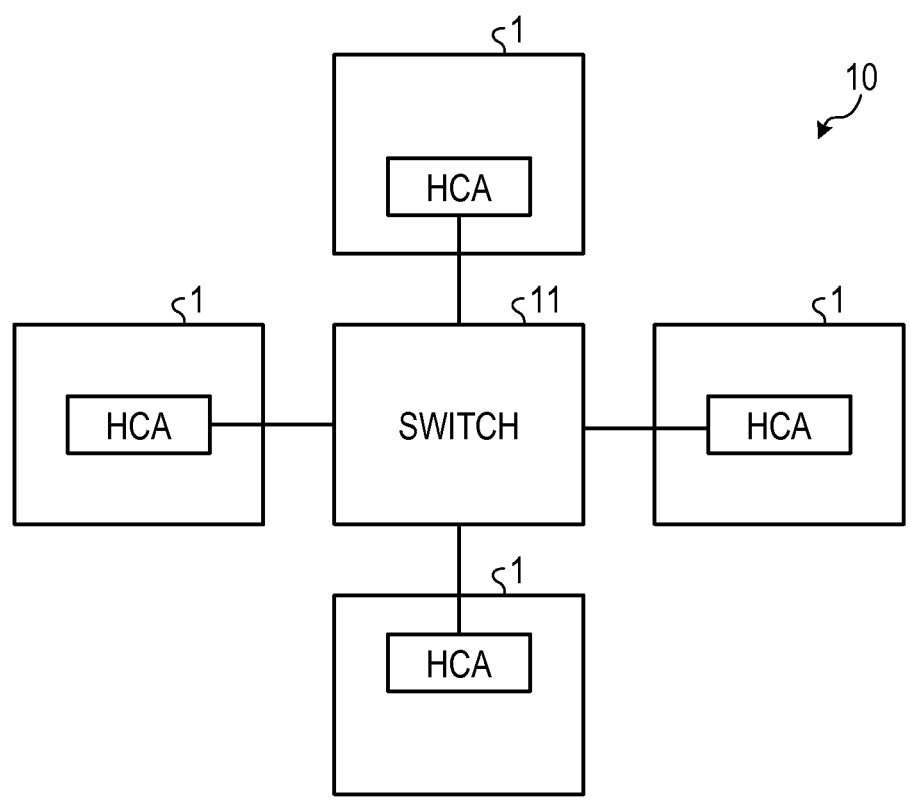
FIG. 15 is a diagram illustrating an example of a configuration of an information processing system, according an embodiment.
Figure 16:
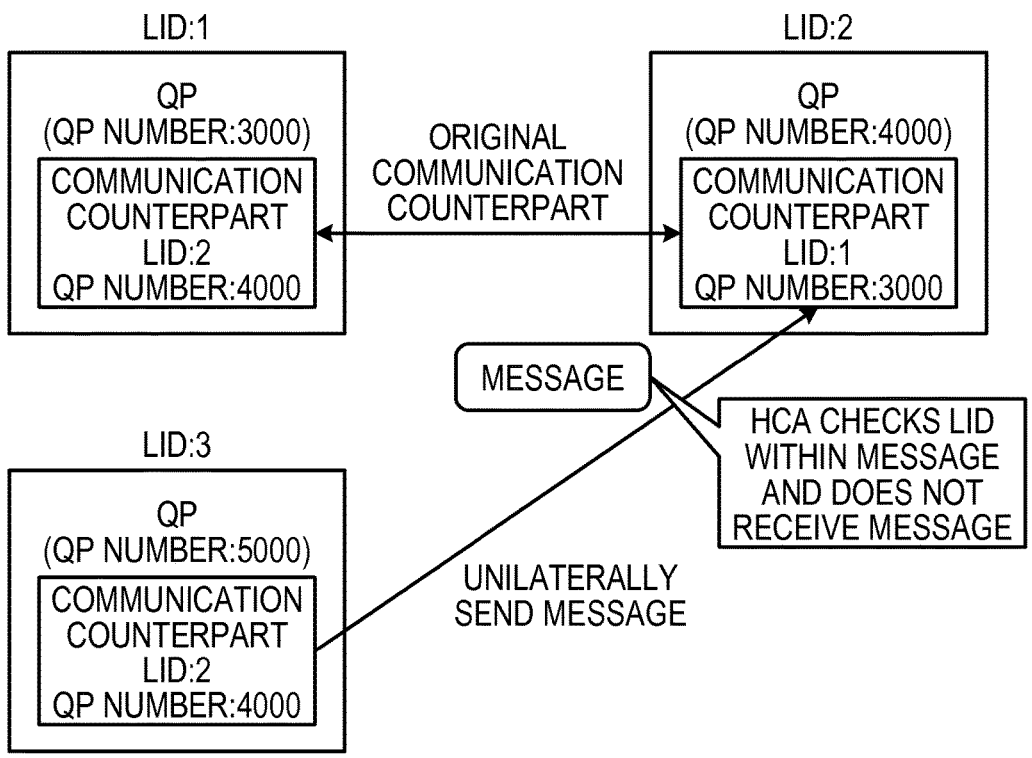
FIG. 16 is a diagram illustrating an example of a situation where a message sent from a communication counterpart other than an original communication counterpart in the RC communication is discarded.
Figure 17:
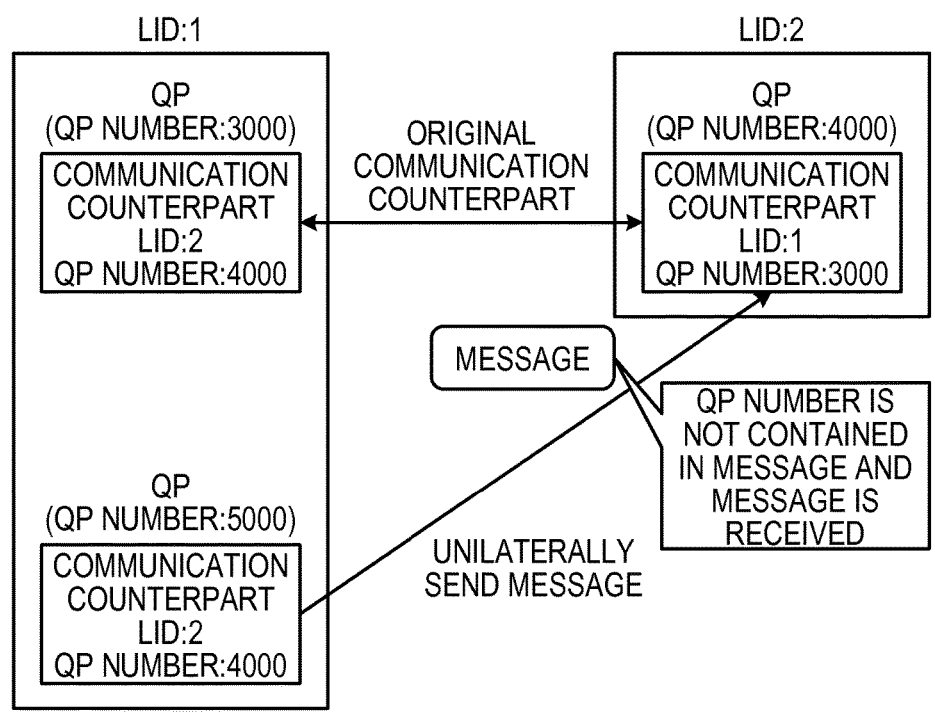
FIG. 17 is a diagram illustrating an example of a situation where a message sent from a communication counterpart other than the original communication counterpart in the RC communication is received.

FIG. 15 is a diagram illustrating an example of a configuration of an information processing system, according an embodiment. As illustrated in FIG. 15, the information processing system 10 includes four information processing apparatuses 1 that are connected together via the switch 11. In the meantime, although the information processing system 10 which includes four information processing apparatuses 1 and a single switch 11 is illustrated, the information processing system 10 may include an arbitrary number of information processing apparatuses 1 and a plurality of switches 11.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for performing communication with another apparatus using InfiniBand in which communication is made between a queue pair (QP) allocated to a user program executed within a sending side apparatus and a QP allocated to a user program executed within a receiving side apparatus, the apparatus comprising:
  a processor configured to:
    when the apparatus serves as the sending side apparatus and a first user program executed within the apparatus transmits first data to the another apparatus, set a specific code in a predetermined area of a send work request via which the first user program controls transmission of the first data, after moving information previously set in the predetermined area of the send work request to a predetermined portion of the first data, and transmit the first data added with a first QP number identifying a first QP allocated to the first user program to the another apparatus,
    when the apparatus serves as the receiving side apparatus and a second user program executed within the apparatus receives second data from the another apparatus, determine that the second data is added with a second QP number identifying a second QP allocated to a third user program executed within the another apparatus when the specific code is set in a predetermined area of a receive work request via which the second user program controls reception of the second data, and identify the third user program executed within the another apparatus based on the second QP number, and send the second data to the second user program via the receive work request after deleting the second QP number from the second data and moving information stored in a predetermined portion of the second data to the predetermined area of the receive work request; and a memory coupled to the processor, configured to store the send work request and the receive work request.

2. The apparatus of claim 1, wherein
the processor is configured to discard the second data when the processor has failed to identify the third user program executed within the another apparatus based on the second QP number added with the second data.

3. The apparatus of claim 1, wherein
when the specific code is set, by the first user program, in the first area of the send work request for the first data, the processor transmits the first data added with the first QP number to the another apparatus.

4. A system for performing communication between apparatuses by using InfiniBand in which communication is made between a queue pair (QP) allocated to a user program executed within a sending side apparatus and a QP allocated to a user program executed within a receiving side apparatus, the system comprising:

a first apparatus serving as the sending side apparatus, configured to, when a first user program executed within the first apparatus transmits data to a second apparatus serving as the receiving side apparatus, set a specific code in an area of a send work request via which the first user program controls transmission of the data, after moving information previously set in the area of the send work request to a predetermined portion of the data, and transmit, to the second apparatus, the data added with a QP number identifying a QP allocated to the first user program executed within the first apparatus; and the second apparatus configured to:
when a second user program executed within the second apparatus receives the data from the first apparatus, determine that the data is added with the QP number identifying the QP allocated to the first user program when the specific code is set in a predetermined area of a receive work request via which the second user program controls reception of the data, and identify the first user program executed within the first apparatus based on the QP number, and send the data to the second user program via the receive work request after deleting the QP number from the data and moving information stored in the predetermined portion of the data to the predetermined area of the receive work request.

5. A non-transitory, computer-readable recording medium having stored therein a relay program for causing a computer included in an apparatus to execute a process, the apparatus performing communication with another apparatus using InfiniBand in which communication is made between a queue pair (QP) allocated to a user program executed within a sending side apparatus and a QP allocated to a user program executed within a receiving side apparatus, the process comprising:

when the apparatus serves as the sending side apparatus and a first user program executed within the apparatus transmits first data to the another apparatus serving as the receiving side apparatus, setting a specific code in a predetermined area of a send work request via which the first user program controls transmission of the first data, after moving information previously set in the predetermined area of the send work request to a predetermined portion of the first data, and transmit the first data added with a first QP number identifying a first QP allocated to the first user program to the another apparatus;

when the apparatus serves as the receiving side apparatus and a second user program executed within the apparatus receives second data from the another apparatus, determining that the second data is added with a second QP number identifying a second QP allocated to a third user program executed within the another apparatus when the specific code is set in a predetermined area of a receive work request via which the second user program controls reception of the second data, and identify the third user program executed within the another apparatus based on the second QP number; and send the second data to the second user program via the receive work request after deleting the second QP number from the second data and moving information stored in a predetermined portion of the second data to the predetermined area of the receive work request.

\* \* \* \* \*